United States Patent [19]

Otsuka et al.

[11] Patent Number: 5,756,060
[45] Date of Patent: May 26, 1998

[54] PROCESS FOR CLEANING HARMFUL GAS

[75] Inventors: Kenji Otsuka; Satoshi Arakawa; Youji Nawa, all of Hiratsuka, Japan

[73] Assignee: Japan Pionics Co., Ltd., Tokyo, Japan

[21] Appl. No.: 740,855

[22] Filed: Nov. 4, 1996

[30] Foreign Application Priority Data

Feb. 29, 1996 [JP] Japan .................. 8-067421

[51] Int. Cl.$^6$ .................................................. B01D 53/68
[52] U.S. Cl. .................. 423/240 R; 423/240 S; 423/241
[58] Field of Search ............... 423/240 S, 241, 423/240 R

[56] References Cited

U.S. PATENT DOCUMENTS

| | | | |
|---|---|---|---|
| 4,594,231 | 6/1986 | Nishino et al. | 423/210 |
| 5,670,445 | 9/1997 | Kitahara et al. | 502/406 |

FOREIGN PATENT DOCUMENTS

| | | | |
|---|---|---|---|
| 0121339A2 | 10/1984 | European Pat. Off. . | |
| 0309099A1 | 3/1989 | European Pat. Off. . | |
| 054646A1 | 6/1993 | European Pat. Off. . | |
| 0673669A2 | 9/1995 | European Pat. Off. . | |
| 4010321 | 10/1991 | Germany | 423/240 S |
| 60-68051 | 4/1985 | Japan . | |
| 61-204022 | 9/1986 | Japan . | |
| 62-125827 | 6/1987 | Japan . | |
| 63-232844 | 9/1988 | Japan . | |
| 64-15135 | 1/1989 | Japan | 423/240 S |
| 6-7637 | 1/1994 | Japan | 423/240 S |
| 63-19947 | 11/1994 | Japan | 423/240 S |
| 7275646 | 10/1995 | Japan . | |
| 916380 | 3/1982 | U.S.S.R. | 423/241 |
| 211491 | 9/1983 | United Kingdom . | |
| 2252966 | 8/1992 | United Kingdom . | |
| WO 93/22049 | 11/1993 | WIPO . | |

*Primary Examiner*—Gary P. Straub
*Assistant Examiner*—Timothy C. Vanoy
*Attorney, Agent, or Firm*—Frishauf, Holtz, Goodman, Langer & Chick, P.C.

[57] ABSTRACT

A process for cleaning a harmful gas which comprises bringing a harmful gas containing a halogen gas and/or a halogen compound gas such as hydrogen fluoride, hydrogen chloride, tungsten hexafluoride, silicon tetrafluoride and boron trifluoride into contact with a cleaning agent comprising metal oxides composed principally of copper (II) oxide and manganese (IV) oxide that are spreadingly and adhesively incorporated with sodium formate so as to remove a harmful component from the harmful gas. According to the cleaning process of the present invention, it is possible to remove harmful components from the harmful gas in extremely high efficiency at ordinary temperature, dispensing with heating or cooling irrespective of the concentration of the harmful components. The cleaning capacity of the cleaning agent is favorably maintained without deterioration even when the harmful gas is in a dry state. Furthermore, the cleaning agent can remove the harmful gas in safety without a fear of causing fire or elimination of the harmful component therefrom. The cleaning process is highly useful and significant in that it is well suited for cleaning exhaust gases from a semiconductor manufacturing process as well as an emergency countermeasure against the leakage of harmful gas from a gas cylinder.

14 Claims, No Drawings

PROCESS FOR CLEANING HARMFUL GAS

BACKGROUND OF THE INVENTION

1. Field of the Invention

The present invention relates to a process for cleaning a harmful gas. More particularly, it pertains to a process for cleaning a harmful gas containing a halogen or a halogen-compound (hereinafter referred simply to as a "halogen-compound") such as fluorine, chlorine, bromine, iodine, chlorine trifluoride, hydrogen fluoride, hydrogen chloride, boron trifluoride, silicon tetrafluoride and tungsten hexafluoride that are used mainly in semiconductor manufacturing processes.

2. Description of Related Arts

There has been a steady rise in the consumption of halogen-compound gases such as fluorine, chlorine, hydrogen fluoride and silicon tetrafluoride in recent years as the semiconductor industry, the optoelectronics industry and the precision machinery industry continue to develop.

These halogen-compound gases are each an indispensable gas as an etching gas, a cleaning gas or a film-forming gas. The above-mentioned halogen-compound gases are used in semiconductor manufacturing processes or the like as such or after being diluted with helium, argon, nitrogen, or the like, and thereafter are exhausted therefrom as such or after being diluted with a gas such as nitrogen or air, and accordingly, the concentration of the exhaust gas is not always constant.

Since each of these halogen-compound gases exerts a harmful influence on human bodies and the environment on account of its high toxicity, it is necessary to clean a harmful gas containing any of these halogen-compounds after being used in a semiconductor manufacturing process prior to the discharge in the atmosphere.

As the means for removing a halogen-compound gas that is contained in an exhaust gas, there have heretofore been available a wet process and a dry process. The wet process is specifically exemplified by a process in which a halogen-compound gas is brought into contact with an aqueous solution of an alkali such as sodium hydroxide to absorb and decompose the gas in a scrubber, spray tower, rotary fine-bubble generating unit or the like (refer to Japanese Patent Application Laid-Open Nos. 204022/1986 and 125827/1987). On the other hand, the dry process is specifically exemplified by a process in which the gas is brought into contact with an adsorbent such as an oxide, carbonate or the like of magnesium, sodium or potassium (refer to Japanese Patent Application Laid-Open NO. 232844/1988); an adsorbent comprising activated carbon impregnated with a zinc compound and an alkali metal compound or the like (refer to Japanese Patent Application Laid-Open No. 68051/1985); an adsorbent comprising soda lime as an effective ingredient; or, in recent years, a cleaning agent comprising a composition containing triiron tetraoxide as a principal ingredient (refer to Japanese Patent Application Laid-Open No. 275646/1995).

However, the above-mentioned wet process involves in general a difficulty in the post-treatment of the liquid used for removing a halogen-compound gas and the process not only requires complicated large equipment but also needs much expense in equipment and maintenance.

On the other hand, the aforesaid dry process in which an adsorbent such as an oxide, carbonate or the like of magnesium, sodium or potassium is used, suffers from the disadvantage of low removal capacity for halogen-compound gas per unit volume of the adsorbent. The adsorbent or cleaning agent comprising activated carbon impregnated with a zinc compound and an alkali metal compound or the like involves the problems that the removal capacity for the harmful gas is insufficient as is the case with the above-mentioned adsorbent, thus failing to cope well with a large amount of gas to be treated. In addition, in the case of treating a highly reactive gas such a fluorine, the activated carbon-based cleaning agent is involved in a possible danger that a fire could break out. It further involves the problem that the harmful components once adsorbed are desorbed because of their physical adsorption.

In the case of the aforesaid soda lime, the removal capacity for the harmful gas is somewhat higher than that of any other cases, but the cleaning agent involves the problem that when said agent is dried out, or when the exhauted harmful gas to be treated has a low concentration, the removal capacity is lowered to a great extent. It also suffers from the disadvantage that there is a fear of causing clogging in a cleaning column because of its deliquescent property in combination with the moisture contained in the gas to be cleaned. In the case of the cleaning agent comprising a composition containing triiron tetraoxide as a principal ingredient, the cleaning agent is excellent in its having a high cleaning capacity at ordinary temperature and its capability of complete and safe cleaning, but suffers from the defect that when being dried, its cleaning capacity is lowered.

Under such circumstances, it has long been desired to realize a cleaning agent that has excellent cleaning capacity for a harmful gas containing halogen-compound gases in low concentrations and in a dry state which gas is exhausted from a semiconductor manufacturing process or the like, and that is capable of removing said gas in high efficiency without any danger of causing fire at the time of cleaning.

SUMMARY OF THE INVENTION

In view of the above, intensive research and investigation were carried out by the present inventors in order to solve the above-mentioned problems. As a result it has been found that, by the use of a cleaning agent comprising metal oxides composed principally of copper (II) oxide and manganese (IV) oxide that are adhesively and spreadingly incorporated with sodium formate, it is made possible to clean a harmful gas containing a halogen-compound in extremely high efficiency and safety without the hazard of causing a fire also without deteriorating the cleaning capacity, even in the state of a dried cleaning agent. The present invention has been accomplished on the basis of the above-mentioned finding and information.

Specifically, the present invention is concerned with a process for cleaning a harmful gas which comprises bringing a harmful gas containing a halogen compound into contact with a cleaning agent comprising metal oxides composed principally of copper (II) oxide and manganese (IV) oxide that are spreadingly and adhesively incorporated with sodium formate so as to remove a harmful component from said harmful gas.

DESCRIPTION OF PREFERRED EMBODIMENT

The process according to the present invention is applied to the cleaning of a harmful halogen-compound gas contained in an exhaust gas exhausted from a semiconductor manufacturing process or the like. Examples of the harmful gas which is an object of cleaning include a halogen gas such as fluorine, chlorine, bromine, iodine and chlorine trifluoride each contained in nitrogen, argon, helium, air or the like; a hydrogen halogenide gas such as hydrogen fluoride, hydrogen chloride, hydrogen bromide and hydrogen iodide each contained in the same; and a halogenide gas such as boron trifluoride, silicon tetrafluoride, germanium tetrafluoride, tungsten hexafluoride and silicon tetrachloride each contained in the same. According to the process for cleaning a harmful gas of the present invention in particular, it is made possible to rapidly and efficiently clean a large amount of a harmful gas at ordinary temperature. The halogen or halogen compound can be in a concentration of $10^5$ ppm or less in the harmful gas.

There is used in the present invention, a cleaning agent comprising specific metal oxides that are spreadingly and adhesively incorporated with sodium formate. The above-mentioned metal oxides comprise copper (II) oxide and manganese (IV) oxide as principal ingredients, and may further comprise an other metal oxide such as silver oxide, aluminum oxide, silicon oxide, potassium oxide and sodium oxide. The content of the copper (II) oxide and manganese (IV) oxide is usually not less than 60% by weight, preferably not less than 70% by weight expressed in terms of the total amount of both the oxides. The ratio by weight of the copper (II) oxide to the manganese (IV) oxide is usually 1:0.2 to 5.0, preferably 1:0.8 to 3.0.

The above-described metal oxide-based composition can be prepared by a method in which the metal oxides are mixed with one another, a method in which the oxides are prepared from a mixed solution of metal compound and any of various well-known methods. It is convenient, however, to make use of the composition available on the market under the trade name "Hopukalite". It is marketed mainly as a binary metallic element system consisting of 40% by weight of copper (II) oxide and 60% by weight of manganese (IV) oxide, and besides as multi-component system comprising other metal oxides such as silver oxide, cobalt oxide, aluminum oxide and magnesium oxide in an amount of not more than 40% by weight expressed in terms of the total amount of these oxides in addition to the two principal metal oxides. The above-mentioned composition may be used alone or in combination with any of these metal oxides to be mixed therewith.

The aforesaid metal oxide composition comprising copper (II) oxide and manganese (IV) oxide as principal ingredients is used usually in the form of a molded item such as an extrusion molded item and a tabletting molded item, or in a variety of shapes and a sizes by crushing the molded items into proper sizes. Preferably, the size thereof is usually 4 to 20 mesh for crushed items and approximately spherical items 1.5 to 4 mm in diameter and 3 to 20 mm in length for extrusion molded item and 3 to 6 mm in diameter and 3 to 6 mm in height for tabletting molded items.

The amount of the sodium formate to be spreadingly and adhesively added to the metal oxides composition varies depending upon the kind and concentration of the halogen-compound gas and thus can not be equivocally specified. In the case where the amount thereof to be added is unreasonably small, sufficient cleaning capacity is not achieved, whereas in the case of the amount thereof being unreasonably large, the sodium formate can not be stably supported on the metal oxide composition, and besides the removal rate for the harmful component is unfavorably lowered. For these reasons, the amount thereof to be added is usually 1 to 60 parts by weight, preferably 20 to 40 parts by weight expressed in terms of sodium formate anhydride per 100 parts by weight of the metal oxides.

The method for spreadingly and adhesively adding the sodium formate to the metal oxides is exemplified by a method comprising the steps of spraying an aqueous solution of sodium formate onto the metal oxides that have been molded in advance, while the oxides are agitated so as to spreadingly and adhesively add the sodium formate to the oxides; and thereafter drying the resultant mixture. The aforesaid method, however, is non-limitative provided that there is available a method capable of adding the sodium formate thereto with an adhesive strength of the extent that the sodium formate thus added is not released during the use or handling of the cleaning agent.

The temperature at which the sodium formate is spreadingly and adhesively added to the metal oxide or the resultant mixture is dried is usually not higher than 70° C., preferably not higher than 50° C., since an unreasonably high temperature causes a fear of deteriorating the cleaning capacity.

The cleaning agent to be used in the present invention is characterized not only in that the cleaning capacity, that is, the capacity for cleaning harmful gas is not lowered even in the case of low moisture content therein, but also in that the cleaning capacity is higher for less moisture content therein. There is used a cleaning agent having a moisture content of usually 0 to 50% by weight, preferably 0 to 30% by weight, since a high moisture content in the cleaning agent involves a fear of causing dry shrinkage of the agent when brought into contact with a dry gas to be cleaned to form voids in a cleaning column, thereby bringing about channelling of the gas.

By regulating the moisture content in the cleaning agent to the above-mentioned level it is made possible to stably maintain the cleaning capacity at an expected level without the deterioration of the cleaning capacity even in the case of dry gas to be cleaned.

The temperature at which the gas is brought into contact with the cleaning agent is usually around ordinary temperature (0° to 50° C.), since in the case of a high temperature there is a fear of causing deterioration of the cleaning capacity with the elapse of time and because the cleaning agent is imparted with sufficient cleaning capacity even at ordinary temperature.

In the case where the harmful gas has a high concentration of harmful components, the heat of reaction due to cleaning is accompanied by a rise in temperature to some extent, but there is no fear of generating abnormal heat because of the temperature rise being limited to about 10° C. and the cooling effect from the flowing gas during the cleaning operation.

The pressure under which the gas to be treated is brought into contact with the cleaning agent is not specifically limited, but is usually atmospheric pressure. It is possible to operate the cleaning system under reduced pressure or under pressure in the range of, for example, from 0.5 to 2.0 kg/cm² abs.

The concentration of the gas to be cleaned to which the process according to the present invention is applied, is not specifically limited, but may be in the range of from a low concentration to a high concentration. In the case of cleaning an exhaust gas at the time of manufacturing semiconductors, an exhaust gas usually having a concentration of from several ppm to several ten thousands ppm is subjected to the cleaning process.

The flow velocity of the gas to be treated to which the process according to the present invention is applied, is not specifically limited, but is designed in the range of usually about 0.1 to 50 cm/sec expressed in terms of superficial linear velocity (LV) on the basis of an empty column.

Preferably, the superficial linear velocity to be set usually decreases with an increase in the concentration of the gas to be treated. For example, the superficial linear velocity for the gas having a concentration as high as 1% or more is set to 10 cm/sec or lower.

The cleaning agent to be employed in the present invention is usually used in the form of a fixed bed, though it is usable in the form of a moving bed or a fluidized bed.

The cleaning agent is packed in a cleaning column, which makes the gas to be treated pass through itself, so that the gas is cleaned through the contact with the cleaning agent thus packed. The packing density of the cleaning agent in the cleaning column is in the range of usually from 0.8 to 1.5 g/cm$^3$, approximately.

As described hereinbefore, according to the process of the present invention it is made possible to clean a harmful gas with high efficiency and safety in a temperature region at around room temperature even in the case where the gas to be treated is a dry gas or is low in the concentration of harmful components.

In the following, the present invention will be described in more detail with reference to comparative examples and working examples, which however, shall not restrict the present invention thereto.

EXAMPLES 1 TO 5

(Metal Oxides)

There was used, as a metal oxides composition, the composition available on the market (produced by Nissan Girdler Co., Ltd. under the trade name Hopukalite) having a chemical composition consisting of 50% by weight of manganese dioxide ($MnO_2$), 22% by weight of cupric oxide (CuO), 12.5% by weight of magnesium oxide (MgO), 12.5% by weight of dialuminum trioxide ($Al_2O_3$) and 3% by weight of moisture in the form of an extrusion molded item having a diameter of 1.5 mm and a length of 3 to 10 mm.

(Preparation of Cleaning Agents)

To 130 g of Hopukalite was spreadingly and adhesively added an aqueous solution of any of 29.6 g, 34.3 g, 36.4 g, 51.1 g and 68.0 g of sodium formate expressed in terms of anhydride in 62 g of water to prepare five kinds of cleaning agents having any of 22.8, 26.4, 28.0, 39.3 and 52.3 parts by weight of sodium formate in terms of an anhydride supported on 100 parts by weight of Hopukalite. The resulting cleaning agents were dried at ordinary temperature in a stream of nitrogen to a moisture content therein of not higher than 5% by weight.

(Cleaning Experiment)

A cleaning experiment was carried out for a harmful gas by the use of each of the five cleaning agents thus prepared. Each of the cleaning agents in a volume of 125.7 milliliter (mL) was packed in a cleaning column with an inside diameter of 40 mm, which allowed dry nitrogen containing chlorine gas in a concentration of 1000 ppm to pass through itself at 20° C., under atmospheric pressure at a superficial linear velocity of 3.0 cm/sec. Part of the gas at the outlet of the cleaning column was sampled, a measurement was made of the concentration of chlorine gas in the cleaned outlet gas by means of a gas-detecting tube (produced by GASTEC Co., Ltd. with a detectable lower limit of 0.2 ppm) as well as a gas detector (produced by Bionics Instrument Co., Ltd. model No. TG-100BA) and a determination was made of the period of time until the concentration of chlorine at the outlet reached the permissible concentration of 1 ppm (effective treatment time. The results are given in Table 1.

TABLE 1

| Ex- ample | Amount of sodium formate to be added (parts by weight) | Moisture content in cleaning agent (% by weight) | Concentration of harmful component (ppm) | Superficial linear velocity (LV) (cm/s) | Effective treatment time (min) |
| --- | --- | --- | --- | --- | --- |
| 1 | 22.8 | 0.98 | 1000 | 3.0 | 773 |
| 2 | 26.4 | 1.60 | 1000 | 3.0 | 1629 |
| 3 | 28.0 | 1.10 | 1000 | 3.0 | 987 |
| 4 | 39.3 | 2.00 | 1000 | 3.0 | 655 |
| 5 | 52.3 | 2.30 | 1000 | 3.0 | 505 |

EXAMPLE 6

To 100 parts by weight of Hopukalite was spreadingly and adhesively added 26.4 parts by weight of sodium formate in terms of anhydride, and thereafter the cleaning agent thus obtained was dried to a moisture content of about 28% by weight. By the use of the resultant cleaning agent thus dried, cleaning experiment was carried out in the same manner as in Examples 1 to 5. The results are given in Table 2.

TABLE 2

| Ex- ample | Amount of sodium formate to be added (parts by weight) | Moisture content in cleaning agent (% by weight) | Concentration of harmful component (ppm) | Superficial linear velocity (LV) (cm/s) | Effective treatment time (min) |
| --- | --- | --- | --- | --- | --- |
| 6 | 26.4 | 28.3 | 1000 | 3.0 | 1585 |

COMPARATIVE EXAMPLE 1

The procedure in Examples 1 to 5 was repeated to carry out the cleaning experiment and determine the effective treatment time except that sodium formate was not added to the Hopukalite same as that used in the preparation of the cleaning agents in Examples 1 to 5. The results are given in Table 3.

TABLE 3

| Com- para- tive Ex- ample | Amount of sodium formate to be added (parts by weight) | Moisture content in cleaning agent (% by weight) | Concentration of harmful component (ppm) | Superficial linear velocity (LV) (cm/s) | Effective treatment time (min) |
| --- | --- | --- | --- | --- | --- |
| 1 | 0.0 | 3.00 | 1000 | 3.0 | 176 |

EXAMPLES 7 TO 10

The procedure in Example 2 was repeated to carry out the cleaning experiment and determine the effective treatment time by the use of the cleaning agent prepared in the same manner as in Example 2 except that alterations were made on the chlorine gas concentration in the untreated harmful gas and the superficial linear velocity in the cleaning column. The results are given in Table 4.

TABLE 4

| Example | Amount of sodium formate to be added (parts by weight) | Moisture content in cleaning agent (% by weight) | Concentration of harmful component (ppm) | Superficial linear velocity (LV) (cm/s) | Effective treatment time (min) |
| --- | --- | --- | --- | --- | --- |
| 7 | 26.4 | 2.65 | 2000 | 2.0 | 1067 |
| 8 | 26.4 | 2.30 | 5000 | 1.0 | 1257 |
| 9 | 26.4 | 2.65 | 15000 | 1.0 | 412 |
| 10 | 26.4 | 1.52 | 50000 | 0.5 | 313 |

EXAMPLE 11

The procedure in Example 2 was repeated to carry out the cleaning experiment and determine the effective treatment time except that the cleaning agent prepared in the same manner as in Example 2 in a volume of 251.2 mL was packed in the cleaning column same as that used in Examples 1 to 5, which allowed dry nitrogen containing chlorine gas to pass through itself at a superficial linear velocity of 50 cm/sec. The results are given in Table 5.

TABLE 5

| Example | Amount of sodium formate to be added (parts by weight) | Moisture content in cleaning agent (% by weight) | Concentration of harmful component (ppm) | Superficial linear velocity (LV) (cm/s) | Effective treatment time (min) |
| --- | --- | --- | --- | --- | --- |
| 11 | 26.4 | 1.52 | 1000 | 50.0 | 73 |

EXAMPLE 12

The procedure in Example 2 was repeated to carry out cleaning experiment and determine the effective treatment time except that an alteration was made on the pressure inside the cleaning column so as to set to 1 kg/cm² G. The results are given in Table 6.

TABLE 6

| Example | Amount of sodium formate to be added (parts by weight) | Moisture content in cleaning agent (% by weight) | Concentration of harmful component (ppm) | Pressure (kg/cm² G) | Superficial linear velocity (LV) (cm/s) | Effective treatment time (min) |
| --- | --- | --- | --- | --- | --- | --- |
| 12 | 26.4 | 1.60 | 1000 | 1.0' | 1.5 | 1630 |

EXAMPLE 13

The procedure in Example 2 was repeated to carry out the cleaning experiment and determine the effective treatment time expect that there was used a metal oxides composition having a chemical composition consisting of 72% by weight of cupric oxide (CuO), 20% by weight of manganese dioxide ($MnO_2$), 5% by weight of dialuminum trioxide ($Al_2O_3$) and 3% by weight of moisture. The results are given in Table 7.

TABLE 7

| Example | Amount of sodium formate to be added (parts by weight) | Moisture content in cleaning agent (% by weight) | Concentration of harmful component (ppm) | Superficial linear velocity (LV) (cm/s) | Effective treatment time (min) |
| --- | --- | --- | --- | --- | --- |
| 13 | 26.4 | 2.00 | 1000 | 3.0 | 883 |

EXAMPLES 14 TO 16

The procedure in Examples 1 to 5 was repeated to carry out the cleaning experiment and determine the effective treatment time except that any of chlorine trifluoride, silicon tetrafluoride and tungsten hexafluoride was used in place of chlorine gas. The results are given in Table 8.

TABLE 8

| Example | Amount of sodium formate to be added (parts by weight) | Moisture content in cleaning agent (% by weight) | Harmful component [kind] | Harmful component [concentration] (ppm) | Superficial linear velocity (LV) (cm/s) | Effective treatment time (min) |
| --- | --- | --- | --- | --- | --- | --- |
| 14 | 26.4 | 3.5 | $ClF_3$ | 1000 | 3.0 | 3051 |
| 15 | 26.4 | 2.5 | $SiF_4$ | 1000 | 3.0 | 2642 |
| 16 | 26.4 | 2.5 | $WF_6$ | 1000 | 3.0 | 1931 |

What is claimed is:

1. A process for removing a harmful gas component from a gas containing at least one harmful gas component, said at least one harmful gas component being selected from the group consisting of a halogen and a halogen compound, which comprises contacting said gas containing said at least one harmful component with a cleaning agent comprising
   (a) metal oxides consisting essentially of copper (II) oxide and manganese (IV) oxide and optionally containing at least one further metal oxide selected from the group consisting of silver oxide, aluminum oxide, silicon oxide, cobalt oxide, magnesium oxide, potassium oxide and sodium oxide, said copper (II) oxide and said manganese (IV) oxide having a total content of at least 60% by weight and being in a ratio by weight of said copper (II) oxide to said manganese (IV) oxide of 1:0.2 to 1:5.0, and
   (b) sodium formate, said sodium formate being spread over and adhesively incorporated with said metal oxides such that the sodium formate is not released from said cleaning agent during its use or handling, said sodium formate being in an amount of 1 to 60 parts by weight in said cleaning agent in terms of sodium formate anhydride per 100 parts by weight of said metal oxides.

to remove said at least one harmful component from said gas.

2. The process according to claim 1 wherein at least one harmful gas component is selected from the group consisting of fluorine, chlorine, bromine, iodine chlorine trifluoride, hydrogen fluoride, hydrogen chloride, hydrogen bromide, hydrogen iodide, boron trifluoride, silicon tetrafluoride, germanium tetrafluoride, tungsten hexafluoride and silicon tetrachloride.

3. The process according to claim 2 wherein the total content of the copper (II) oxide and the manganese (IV) oxide is at least 70% by weight.

4. The process according to claim 3 wherein the ratio by weight of the copper (II) oxide to the manganese (IV) oxide is 1:0.8 to 3.0.

5. The process according to claim 4 wherein the sodium formate is incorporated into the cleaning agent in an amount of 20 to 40 parts by weight expressed in terms of sodium formate anhydride per 100 parts by weight of the metal oxide.

6. The process according to claim 5 wherein the cleaning agent has a moisture content of 0 to 30% by weight.

7. The process according to claim 6 wherein the process is carried out at a temperature of 0° to 50° C.

8. The process according to claim 7 wherein the gas flows at a superficial linear velocity of 0.1 to 50 cm/second.

9. The process according to claim 7 wherein the process is carried out in a packed column and the cleaning agent has a packed density of 0.8 to 1.5 g/cm$^3$.

10. The process according to claim 2 wherein the gas contains said at least one harmful gas component in a concentration of $10^5$ ppm or less.

11. The process according to claim 1 wherein the gas contains said at least one harmful gas component in a concentration of $10^5$ ppm or less.

12. The process according to claim 1 wherein the cleaning agent has a moisture content of 0 to 50% by weight.

13. The process according to claim 1 wherein said cleaning agent is in the form of a crushed molded particles or tabletted molded particles.

14. The process according to claim 1, wherein said metal oxides of said cleaning agent consist essentially of copper (II) oxide, manganese (IV) oxide, and at least one further metal oxide selected from the group consisting of silver oxide, aluminum oxide, silicon oxide, cobalt oxide, magnesium oxide, potassium oxide and sodium oxide.

* * * * *